United States Patent
Jadamus et al.

(12)
(10) Patent No.: US 6,428,866 B1
(45) Date of Patent: *Aug. 6, 2002

(54) MULTILAYER PLASTIC COMPOSITION HAVING AN ELECTRICALLY CONDUCTIVE INNER LAYER

(75) Inventors: Hans Jadamus; Hans Ries, both of Marl; Stefan Roeber, Hamburg, all of (DE)

(73) Assignee: Degussa-Huels Aktiengesellschaft, Frankfurt am Main (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/438,426

(22) Filed: Nov. 12, 1999

Related U.S. Application Data

(62) Division of application No. 08/888,506, filed on Jul. 7, 1997, now Pat. No. 6,090,459, which is a continuation of application No. 08/609,612, filed on Mar. 1, 1996, now abandoned.

(30) Foreign Application Priority Data

Mar. 1, 1995 (DE) .......................... 195 07 025

(51) Int. Cl.$^7$ ........................... B32B 1/08; B32B 27/00; B32B 27/12

(52) U.S. Cl. .................. 428/36.4; 428/36.91; 428/213; 428/421; 428/422; 428/474.7; 428/475.2; 428/476.9; 428/483; 428/516; 428/518

(58) Field of Search .................. 428/36.91, 36.4, 428/421, 422, 474.7, 475.2, 476.9, 483, 516, 518, 213

(56) References Cited

U.S. PATENT DOCUMENTS

| | | | |
|---|---|---|---|
| 4,303,457 A | 12/1981 | Johansen et al. | |
| 4,764,419 A | 8/1988 | Sadhir et al. | |
| 5,132,394 A | 7/1992 | Bockrath | |
| 5,258,213 A | 11/1993 | Mügge et al. | |
| 5,313,987 A | 5/1994 | Röber et al. | |
| 5,362,529 A | 11/1994 | Mugge et al. | |
| 5,362,570 A | 11/1994 | Röber et al. | |
| 5,389,410 A | 2/1995 | Mugge et al. | |
| 5,404,915 A | 4/1995 | Mugge et al. | |
| 5,425,817 A | 6/1995 | Mugge et al. | |
| 5,449,024 A | 9/1995 | Röber et al. | |
| 5,472,784 A | 12/1995 | Röber et al. | |
| 5,474,822 A | 12/1995 | Röber, et al. | |
| 5,478,620 A | 12/1995 | Mügge et al. | |
| 5,500,263 A | 3/1996 | Röber et al. | |
| 5,510,160 A | 4/1996 | Jadamus et al. | |
| 5,512,342 A | 4/1996 | Röber et al. | |
| 5,554,426 A * | 9/1996 | Rober et al. | 428/36.91 |
| 5,637,408 A | 6/1997 | Oenbrink et al. | |
| 5,759,329 A * | 6/1998 | Krause et al. | 156/244.13 |
| 5,798,048 A | 8/1998 | Ries | |
| 5,858,492 A | 1/1999 | Röber et al. | |
| 5,884,671 A * | 3/1999 | Noone et al. | 138/137 |
| 6,089,278 A * | 7/2000 | Nishino et al. | 138/137 |
| 6,090,459 A * | 7/2000 | Jadamus et al. | 428/36.4 |
| 6,192,942 B1 * | 2/2001 | Hsich et al. | 138/137 |

FOREIGN PATENT DOCUMENTS

| | | |
|---|---|---|
| BE | 632 328 | 5/1963 |
| DE | 1 283 615 | 11/1968 |
| DE | 24 20 753 | 11/1975 |
| EP | 0 470 606 | 1/1992 |
| EP | 0 582 301 | 2/1994 |
| EP | 0 582 302 | 2/1994 |
| GB | 2 018 780 | 10/1979 |
| GB | 21 211 266 | 6/1989 |
| WO | 93/21466 | 10/1993 |
| WO | 94/09303 | 4/1994 |
| WO | WO 94/23433 | 10/1994 |
| WO | 95-30105 | 11/1995 |

OTHER PUBLICATIONS

"Graphie fiber brings new look to conductive plastics", PW Technology News, Nov. 16, 1993.*
New Riverside University Dictionary, The Riverside Publishing Co., p. 474 (1984).

* cited by examiner

Primary Examiner—Rena L. Dye
(74) Attorney, Agent, or Firm—Oblon, Spivak, McClelland, Maier & Neustadt, P.C.

(57) ABSTRACT

A multilayer plastic composition having (I) an outer layer of a thermoplastic molding composition and (II) an inner layer of an electrically conductive thermoplastic molding composition containing graphite fibrils, which are useful for the transport of (petro) chemical materials and also in the motor vehicle sector for conveying brake, cooling and hydraulic fluid and also fuel.

48 Claims, No Drawings

MULTILAYER PLASTIC COMPOSITION HAVING AN ELECTRICALLY CONDUCTIVE INNER LAYER

This application is a division of application Ser. No. 08/888,506, filed Jul. 7, 1997, now U.S. Pat. No. 6,090,459, which is a continuation of application Ser. No. 08/609,612, filed Mar. 1, 1996, now abandoned.

BACKGROUND OF THE INVENTION

1. Field of the Invention

The present invention relates to a multilayer plastic composition pipe having an inner layer that has been made lastingly antistatic by addition of graphite fibrils.

2. Discussion of the Background

Multilayer pipes based on polyamides are known (DE-A 41 12 662, 41 12 668, 41 37 430, 41 37 431, 41 37 434, 42 07 125, 42 14 383, 42 15 608, 42 15 609, 42 40 658, 43 02 628, 43 10 884, 43 26 130, 43 36 289, 43 36 290, 43 36 291, 44 10 148, W0-A93/21466, EP-A-0 198 728 and EP-A-0 558 373). Making the inner layer conductive by addition of carbon black or carbon fibers is also know (see DE-A 40 25 301).

However, the use of such conductive inner layers is associated with a series of disadvantages:

a) They are insufficiently resistant to peroxide-containing fuels (sour gas). This shows up, for example, in a serious deterioration of the cold impact toughness occurring after only relatively short storage time in contact with sour-gas-containing fuels (e.g. according to the Ford specification FLTM AZ 105-01, PN 180 or according to the GM specification GM213M, PN 50).

b) After bending, thermoforming or after prolonged contact with fuel, the layers have sharply reduced conductivity, which can lead to complete loss.

c) The surface roughness leads to leakages at connections using conventional Quick Connectors.

d) The high carbon black or fiber loading in the molding compositions results in a high pressure build-up during extrusion. This requires a lowering of the production rate to uneconomically low values.

e) The use of carbon fibers causes an undesired increase in the flexural stiffness.

f) Finally, the conventional amounts of added carbon black undesirably reduce the cold impact toughness.

SUMMARY OF THE PRESENT INVENTION

Accordingly, one object of the present invention is to provide a multilayer plastic composition having an electrically conductive inner layer, which avoids the above-noted disadvantages.

Another object of the present invention is to provide a plastic pipe prepared from the multilayer plastic composition which is useful for transport of (petro)chemical materials in either solid or liquid form.

Another object of the present invention is to provide a filling port for tanks in the motor vehicle industry prepared from the multilayer plastic composition.

These and other objects of the present invention have been satisfied by the discovery of a multilayer plastic composition containing the following layers:

I. An outer layer comprising a thermoplastic molding composition and

II. An inner layer comprising an electrically conductive thermoplastic molding composition, wherein the electrically conductive molding composition contains graphite fibrils.

DETAILED DESCRIPTION OF THE PREFERRED EMBODIMENTS

The present invention relates to a multilayer plastic composition comprising:

(I) an outer layer comprising a thermoplastic molding composition and (II) an inner layer comprising an electrically conductive thermoplastic molding composition and graphite fibrils.

The multilayer plastic composition can take any desired form, with multilayer pipes, hollow bodies (such as fuel tanks), filling ports for tanks, etc. being preferred.

In addition, further layers may be present, such as a conventional barrier layer for fuel components, as an intermediate layer. The barrier layer can, if desired, be adhesively bonded to the adjacent layers by means of a bonding agent.

The outer layer of the present invention comprises a polyamide molding composition, a polyolefin molding composition, a polyacetal molding composition, a polyketone molding composition, or molding composition of thermoplastic polyesters or polyester elastomers. Molding compositions suitable as inner layers for the present multilayer pipe include those based on polyamides, polyolefins, polyacetals, polyketones, thermoplastic polyesters or fluoropolymers.

Polyamides useful in the present invention are primarily aliphatic homopolyamides and copolyamides. Suitable examples include the 4.6-, 6.6-, 6.12-, 8.10-, and 10.10-polyamides with 6-, 10.12-, 11-, 12- and 12.12-polyamides being preferred. (The naming of the polyamides corresponds to the international standard, where the first digit(s) indicates the number of carbon atoms in the starting diamine and the last digit(s) indicates the number of carbon atoms in the dicarboxylic acid. If only one number is given, this means that the starting material was an α,•-aminocarboxylic acid or the lactam derived therefrom—H. Domininghaus, Die Knust stoffe und ihre Eigenschaften, page 272, VDI-Verlag (1976) .)

If copolyamides are used, these can contain coacids, such as adipic acid, sebacic acid, suberic acid, isophthalic acid or terephthalic acid or codiamine, such as bis(4-aminocyclohexyl)methane, trimethylhexamethylenediamine, or hexamethylenediamine.

The preparation of these polyamides is known (for example: D. B. Jacobs, J. Zimmermann, Polymerization Processes, pp. 424–467; Interscience Publishers, New York (1977); DE-B 21 52 194).

Likewise suitable as polyamides are mixed aliphatic/aromatic polycondensates as are described, for example, in U.S. Pat. Nos. 2,071,250, 2,071,251, 2,130,523, 2,130,948, 2,241,322, 2,312,966, 2,512,606, 3,393,210 or in Kirk-Othmer; Encyclopedia of Chemical Technology, 3rd edition, Vol. 18, Wiley & Sons (1982), pp. 328 and 435. Further polycondensates which are suitable as polyamides are poly (ether esteramides) or poly(etheramides). Such products are described in DE-A 27 12 987, 25 23 991 and 30 06 961.

The number average molecular weight, Mn, of the polyamides is above 4000, preferably above 10,000. The relative viscosity ($\eta_{rel}$) is preferably in the range from 1.65 to 2.4.

The polyamides can contain up to 40% by weight of other thermoplastics, as long as they do not interfere with the properties required in the multilayer composition of the present invention. Suitable other thermoplastics include polycarbonate (H. Schnell, Chemistry and Physics of Polycarbonates, Interscience Publishers, New York (1981)], acrylonitrile/styrene/butadiene copolymers [Houben-Weyl, Methoden der organischen Chemie, Vol. 14/1, Georg Thieme Verlag Stuttgart, pp. 393–406; Ullmanns Encyclopädie der technischen Chemie, 4th edition, Vol. 19, Verlag Chemie Weinheim (1981), pp. 279–284], acrylonitrile/styrene/acrylate copolymers [Ullmanns Encyclopädie der technischen Chemie, 4th edition, Vol. 19, Verlag Chemie Weinheim (1981), pp. 277–295], acrylonitrile/styrene copolymers [Ullmanns Encyclopädie der technischen Chemie], 4th edition, Vol. 19, Verlag Chemie Weinheim (1981), p. 273 ff.] or polyphenylene ethers (DE-A 32 24 691 and 32 24 692, U.S. Pat. No. 3,306,874, 3,306,875 and 4,028,341).

If required, the polyamides can be impact modified. Suitable modifiers include ethylene/propylene copolymers or ethylene/propylene/diene copolymers (EP-A-0295 076), polypentenylene, polyoctenylene or random or block copolymers of alkenylaromatic compounds with aliphatic olefins or dienes (EP-A-0 261 748). Furthermore, core/shell rubbers having a viscoelastic core of (meth)acrylate, butadiene or styrene/butadiene rubber having glass transition temperatures $T_g<-10°$ C. can be used as impact-modifying rubbers, with the core of the rubbers being crosslinkable. The shell can be made up of styrene and/or methyl methacrylate and/or further unsaturated monomers (DE-A 21 44 528, 37 28 685). The proportion of impact-modifying components is to be selected such that the desired properties are not impaired.

The polyamides can be used on their own or in mixtures.

Suitable polyolefins include homopolymers and copolymers of α-olefins having from 2 to 12 carbon atoms, such as ethylene, propene, 1-butene, 1-hexene or 1-octene. Also suitable are copolymers and terpolymers containing further ethylenically unsaturated monomers, in particular dienes such as ethylideneorbornene, cyclopentadiene or butadiene.

Preferred polyolefins are polyethylene and polypropylene. In principle, any commercial grade of these can be used. Thus, suitable examples are linear polyethylene of high, intermediate or low density, LDPE, ethylene copolymers with relatively small amounts (up to a maximum of about 40% by weight) of comonomers, including but not limited to n-butyl acrylate, methyl methacrylate, maleic anhydride, styrene, vinyl alcohol, acrylic acid, or glycidyl methacrylate, isotactic or atactic homopolypropylene, random copolymers of propene with ethene and/or 1-butene, and ethylene propylene block copolymers. Such polyolefins can also contain an impact-modifying component, such as EPM or EPDM rubber or SEBS. Furthermore, they can also contain functional monomers such as maleic anhydride, acrylic acid or vinyltrimethoxysilane in grafted form.

Polyacetals, also known as polyoxymethylenes, are described in "Kunststoff-Handbuch" (Ed.: R. Vieweg, M. Reiher, H. Scheurlen), pp. 1–98, Vol. XI, Karl Hanser Verlag München 1971.

Polyketones are alternating copolymers of carbon monoxide and olefins. They are described, for instance, in A. Walker, G. Kormelink, P. Verbeke, J. C. M. Jordaan, Kunststoffe 85 (1995) 8, as well as in EP-A-0 121 965 and EP-A-0 181 014.

The thermoplastic polyesters have the following basic structure:

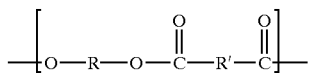

where R is a divalent branched or unbranched aliphatic and/or cycloaliphatic radical having from 2 to 12, preferably from 2 to 6, carbon atoms in the carbon chain and R' is a divalent aromatic radical having from 6 to 20, preferably from 6 to 12, carbon atoms in the carbon skeleton.

Examples of suitable diols which can be used in the preparation of the polyesters are ethylene glycol, trimethylene glycol, tetramethylene glycol, hexamethylene glycol, neopentyl glycol, or cyclohexanedimethanol. Up to 25 mol % of the diol can be replaced by a diol having the following general formula

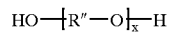

where R″ is a divalent radical having from 2 to 4 carbon atoms and x is from 2 to 50.

Preferred diols are ethylene glycol and tetramethylene glycol.

Suitable aromatic dicarboxylic acids for use in preparing the polyesters include terephthalic acid, isophthalic acid, 1,4-, 1,5-, 2,6- or 2,7-naphthalenedicarboxylic acid, diphenic acid, (diphenyl ether)-4,4'-dicarboxylic acid or their polyester-forming derivatives, such as their dimethyl esters.

Up to 20 mol % of these dicarboxylic acids can be replaced by aliphatic dicarboxylic acids such as succinic acid, maleic acid, fumaric acid, sebacic acid, or dodecanedioic acid.

The thermoplastic polyesters can be prepared by conventional processes (DE-A 24 07 155, 24 07 156; Ullmanns Encyclopädie der technischen Chemie, 4th edition, Volume 19, page 65 ff, Verlag Chemie GmbH, Weinheim 1980).

The polyesters used according to the present invention have a viscosity number (J value) in the range from 80 to 240 $cm^3/g$.

Preferred thermoplastic polyesters are polyethylene terephthalate, polybutylene terephthalate and polybutylene naphthalate.

If required, the polyesters can be impact modified.

Suitable fluoropolymers include ethylene-tetrafluoroethylene copolymers or terpolymers (ETFE; e.g. TEFZEL 200 from DuPont, HOSTAFLON ET 6235 from Hoechst or Neoflon EP 610/EP 620 from Daikin), tetrafluoroethylene-hexafluoropropene-vinylidene fluoride terpolymers (THV; e.g. HOSTAFLON TFB from Hoechst), ethylene-chlorotrifluoroethylene copolymers (ECTFE; e.g. HALAR from Ausimont) or polyvinylidene fluoride (PVDF). While these polymers can contain plasticizers, the use of plasticizer-free fluoropolymers is preferred. ETFE, THV and ECTFE are described in H. Domininghaus, Die Kunststoffe und ihre Eigenschaften, 4th edition, Chapter 2.1.7 (Fluor-Kunststoffe).

The preparation and structure of polyvinylidene fluoride are also known (see Hans R. Kricheldorf, Handbook of Polymer Synthesis, Part A, Marcel Dekker Inc. New York—Basle-Hong Kong, p. 191 ff.: Kunststoff-Handbuch, 1st edition, Volume XI, Carl Hanser Verlag Munich (1971), p. 403 ff.).

According to the present invention, polymers based on polyvinylidene fluoride containing up to 40% by weight of other monomers can also be present. Suitable examples of such additional monomers are: trifluoroethylene, ethylene, propene and hexafluoropropene.

The polyvinylidene fluoride used according to the present invention preferably has a melt flow index of <17 g/10 min, more preferably from 2 to 13 g/10 min (DIN 53 735), measured at 230° and under a load of 5 kg.

Graphite fibrils are known. They are described, for example, in Plastics World, November 1993, page 10 ff. These are tiny fibers of crystalline graphite. In the material commercially available at present, their average diameter is in the order of 0.01 micron with an L/D ratio of the order of from 500:1 to 1000:1. Suitable graphite fibrils for use in the present invention also include those described in WO applications Nos. 8603455, 8707559, 8907163, 9007023 and 9014221 and in JP-A-03287821.

The content of graphite fibrils in the inner layer is generally from 1 to 30% by weight, preferably from 1.5 to 10% by weight and more preferably from 2 to 7% by weight.

The optionally present barrier layer for fuel components can comprise a molding composition based on thermoplastic polyester, polyvinylidene fluoride (PVDF), ETFE, THV, polyolefins, ethylene/vinyl alcohol copolymer (EVOH), polyketones or polyacetals. For suitable embodiments, reference may be made to the patent applications mentioned.

Reference is here given to using polybutylene terephthalate as thermoplastic polyester.

The multilayer compositions of the present invention are preferably produced by conventional coextrusion, preferably for the production of multilayer pipes. Such production of multilayer pipes by coextrusion is known.

The thickness of the inner layer is selected so that, on the one hand, an electrical potential formed can reliably be conducted away, but, on the other hand, as little material as possible is required for cost reasons. The inner layer can here be very thin, such as between 0.01 and 0.1 mm. However, for certain applications, thicknesses of from 0.2 to 0.3 mm can also be advantageous. In general, the ratio of the thickness of the inner layer to the thickness of the outer layer or to the sum of the thicknesses of the other layers is from 1:5 to 1:100.

The multilayer compositions of the present invention have a good sour-gas resistance and meet the demands of Ford specification WSL-M98D28-A towards a fuel according to Ford FLTM AZ 105-01 towards PN180 and also the GM specification GM213M towards PN50.

In addition, they effectively prevent the build-up of high potentials and meet GM specification GM213M (draft April 1993), point 4.19. Their surface resistance is preferably less than $10^5$ Ω/sq. This also applies after bending a number of times and after storage in fuels.

The plastic pipes of the present invention are preferably used for the transport of petrochemical materials or in the motor vehicle sector for conveying brake, cooling and hydraulic fluids and also fuel, including, in particular, methanol-containing or ethanol-containing fuel. A further use of the multilayer compositions is in the production of hollow bodies such as tanks or filling ports, particularly for the motor vehicle sector. These hollow bodies are produced, for example, by a blow-molding process downstream of the coextrusion.

Furthermore, the plastic pipes of the present invention can be used as transport pipes for solids. Combustible, pulverulent or dust-like solids such as flour have to be conveyed in pipes having antistatic properties so as to avoid dust explosions.

Having generally described this invention, a further understanding can be obtained by reference to certain specific examples which are provided herein for purposes of illustration only and are not intended to be limiting unless otherwise specified.

Examples denoted by letters are not according to the present invention. All percentages are by weight.

EXAMPLES

Materials used:

PA 1: Polyamide 12 ($\eta_{rel}$:2.1; containing plasticizer, impact-modified; 60 mmol/kg of amino end groups; 10 mmol/kg of carboxyl end groups; VESTAMID® X 7297 from HÜLS AG).

PA 2: Polyamide 12 ($\eta_{rel}$:2.1; containing plasticizer, impact-modified; 15 mmol/kg of amino end groups; 40 mmol/kg of carboxyl end groups; VESTAMID® X 7293 from HÜLS AG).

PES 1: VESTODUR® 1000 from HÜLS AG modified in accordance with DE-A-42 40 658 (homopolybutylene terephthalate).

PVDF 1: Polyvinylidene fluoride (melt flow index 13 g/10 min; DYFLOR® LE from HÜLS AG).

PVDF 2: PVDF 1 modified in accordance with DE-A-43 26 130.

GF 1: Graphite fibrils from Hyperion Catalysis International, grade BN.

GF 2: Graphite fibrils from Hyperion Catalysis International, grade CC.

Conductivity black: KETJENBLACK EC 300 from Akzo Chemie.

The mixtures were prepared in a twin-screw compounder at a temperature of 260° C.

The pipes were produced on a laboratory extrusion unit fitted with a five-layer die (in the production of the two-, three- and four-layer pipes, the channels not required remain closed).

Pipes having an external diameter of 8 mm and a total wall thickness of 1 mm were produced.

TABLE 1

Properties of the pipes

| Example | Layer structure | Pressure required | Cold impact test at −40° C. in accordance with SAE J 2043 | | | Surface resistance according to GM 213 M [Ω/sq] | | | | Leakage at the Quick Connector[d] [g/day] |
|---|---|---|---|---|---|---|---|---|---|---|
| | | | as molded | 1000 h, PN 180, 23° C. acc. to Ford spec.[b] | 1000 h, PN 50, 40° C. acc. to GM 213 M | as molded | after bending 5 times | storage for 1000 h in PN 180, 23° C. | storage for 1000 h in PN 50, 40° C. | |
| 1 | 0.4 mm PA 1<br>0.2 mm PES 1<br>0.3 mm PA 1<br>0.1 mm PA 2<br>with 5% GF 1 | 150 bar | no fracture | no fracture | no fracture | $5 \cdot 10^3$ | $5 \cdot 10^4$ | $8 \cdot 10^3$ | $2 \cdot 10^4$ | 0.11 |
| 2 | 0.4 mm PA 1<br>0.2 mm PES 1<br>0.3 mm PA 1<br>0.1 mm PA 2<br>with 3% GF 2 | 135 bar | no fracture | no fracture | no fracture | $10^4$ | $10^5$ | $5 \cdot 10^4$ | $7 \cdot 10^4$ | 0.09 |

TABLE 1-continued

Properties of the pipes

| Example | Layer structure | Pressure required | Cold impact test at −40° C. in accordance with SAE J 2043 | | | Surface resistance according to GM 213 M [Ω/sq] | | | | Leakage at the Quick Connector[d] [g/day] |
|---|---|---|---|---|---|---|---|---|---|---|
| | | | as molded | 1000 h, PN 180, 23° C. acc. to Ford spec.[b] | 1000 h, PN 50, 40° C. acc. to GM 213 M | as molded | after bending 5 times | storage for 1000 h in PN 180, 23° C. | storage for 1000 h in PN 50, 40° C. | |
| 3 | 0.4 mm PA 2<br>0.2 mm PVDF 2<br>0.3 mm PA 2<br>0.1 mm PA 2 with 5% GF 1 | 150 bar | no fracture | no fracture | no fracture | $5 \cdot 10^3$ | $3 \cdot 10^4$ | $9 \cdot 10^1$ | $2 \cdot 10^4$ | 0.11 |
| 4 | 0.4 mm PA 2<br>0.2 mm PVDF 2<br>0.3 mm PA 2<br>0.1 mm PA 2 with 3% GF 2 | 135 bar | no fracture | no fracture | no fracture | $2 \cdot 10^4$ | $3 \cdot 10^5$ | $5 \cdot 10^4$ | $8 \cdot 10^4$ | 0.10 |
| 5 | 0.9 mm PA 2<br>0.1 mm PA 2 with 5% GF 1 | 135 bar | no fracture | no fracture | no fracture | $4 \cdot 10^3$ | $3 \cdot 10^4$ | $6 \cdot 10^4$ | $10^4$ | [e] |
| A | 0.4 mm PA 1<br>0.2 mm PES 1<br>0.3 mm PA 1<br>0.1 mm PA 2 with 20% conductivity black | 320 bar | no fracture | not passed | not passed | $10^8$ | $10^9$ | $10^9$ | $10^{11}$ | 0.18 |
| B | 0.4 mm PA 1<br>0.2 mm PES 1<br>0.3 mm PA 1<br>0.1 mm PA 2 with 15% conductivity black | 280 bar | no fracture | not passed | not passed | $10^{10}$ | $10^{12}$ | $10^{11}$ | $10^{11}$ | 0.17 |
| C | 0.4 mm PA 2<br>0.2 mm PVDF 2<br>0.3 mm PA 2<br>0.1 mm PA 2 with 20% conductivity black | 320 bar | no fracture | not passed | not passed | $10^8$ | [e] | [e] | [e] | [e] |
| D | 0.9 mm PA 2<br>0.1 mm PA 2 with 10% conductivity black | 260 bar | no fracture | no fracture | not passed | $10^{13}$ | [e] | [e] | [e] | [e] |
| E | 0.9 mm PA 2<br>0.1 mm PA 2 with 20% conductivity black | 315 bar | not passed | [e] | [e] | $10^8$ | [e] | [e] | [e] | [e] |
| 6 | 0.8 mm PA 2<br>0.1 mm PVDF 2<br>0.1 mm PVDF 1 with 4% GF 1 | 210 bar | no fracture | no fracture | no fracture | $10^5$ | $5 \cdot 10^5$ | $4 \cdot 10^5$ | $4 \cdot 10^5$ | 0.13 |
| F | 0.8 mm PA 2<br>0.1 mm PVDF 2<br>0.1 mm PVDF 1 with 15% conductivity black | 280 bar | not passed | [e] | [e] | $10^6$ | [e] | [e] | [e] | 0.22 | a) for extrusion of the inner layer, 15 m/min
b) conditioning of the pipes using sour-gas-containing fuel (PN 180 at 23° C. flowing through for 1000 hours in accordance with Ford WSL-M98D28-A, point 3.4.10)
c) conditioning of the pipes with Sour-gas-containing fuel (PN 50 at 40° C. flowing through for 1000 hours in accordance with GM213M, point 4.10)
d) test using FAM B, 60° C. 4 bar gauge pressure in a permeation tester in accordance with the Opel specification GME 08 100, point 7.8
e) not tested.

This application is based on German patent application No. 195 07 025.9 filed Mar. 1, 1995, incorporated herein by reference. Obviously, numerous modifications and variations of the present invention are possible in light of the above teachings. It is therefore to be understood that within the scope of the appended claims, the invention may be practiced otherwise than as specifically described herein.

What is claimed is:

1. A plastic pipe for the transport of materials prepared from a multilayer plastic composition comprising:

(I) an outer layer comprising a thermoplastic molding composition and (II) an inner layer comprising an electrically conductive thermoplastic molding composition made conductive by adding graphite fibrils.

2. A hollow body prepared from a multilayer plastic composition comprising:
(I) an outer layer comprising a thermoplastic molding composition and
(II) an inner layer comprising an electrically conductive thermoplastic molding composition made conductive by adding graphite fibrils.

3. A filling port for a tank used in a motor vehicle prepared from a multilayer plastic composition comprising:
(I) an outer layer comprising a thermoplastic molding composition and
(II) an inner layer comprising an electrically conductive thermoplastic molding composition made conductive by adding graphite fibrils.

4. The plastic pipe according to claim 1, wherein the graphite fibrils are present in the inner layer (II) in an amount of from 1 to 30% by weight based on the amount of the inner layer (II).

5. The plastic pipe according to claim 1, wherein the graphite fibrils are present in the inner layer (II) in an amount of from 1.5 to 10% by weight based on the amount of the inner layer (II).

6. The plastic pipe according to claim 1, wherein the graphite fibrils are present in the inner layer (II) in an amount of from 2 to 7% by weight based on the amount of the inner layer (II).

7. The plastic pipe according to claim 1, wherein the outer layer (I) comprises a polyamide molding composition, a polyolefin molding composition, a polyester molding composition or a polyester elastomer molding composition.

8. The plastic pipe according to claim 1, wherein the inner layer (II) comprises a polyamide molding composition, a polyolefin molding composition, a polyester molding composition or a fluoropolymer molding composition.

9. The plastic pipe according to claim 8, wherein the inner layer (II) is a fluoropolymer molding composition comprising a fluoropolymer selected from the group consisting of an ethylene-tetrafluoroethylene copolymer or terpolymer (ETFE), a tetrafluoroethylene-hexafluoropropene-vinylidene fluoride terpolymer (THV), an ethylene-chlorotrifluoroethylene copolymer (ECTFE) and a polyvinylidene fluoride (PVDF).

10. The plastic pipe according to claim 9, wherein the fluoropolymer is a PVDF homopolymer or a copolymer of vinylidene fluoride containing up to 40% by weight of other monomers.

11. The plastic pipe according to claim 1, further comprising a barrier layer for fuel components as an intermediate layer between said inner layer and said outer layer.

12. The plastic pipe according to claim 11, wherein the barrier layer comprises a polyester molding compositions, a PVDF molding composition, or an EVOH molding composition.

13. The plastic pipe according to claim 12, wherein the barrier layer is polybutylene terephthalate.

14. The plastic pipe according to claim 1, wherein said inner layer and said outer layer each have a thickness, and wherein one or more additional layers each having a thickness are optionally present wherein a ratio of the thickness of the inner layer to the thickness of the outer layer or to a sum of thicknesses of all other layers is from 1:5 to 1:100.

15. The plastic pipe according to claim 1, wherein the outer layer (I) comprises a polyamide molding composition and the inner layer (II) comprises a polyamide molding composition.

16. The hollow body according to claim 2, wherein the graphite fibrils are present in the inner layer (II) in an amount of from 1 to 30% by weight based on the amount of the inner layer (II).

17. The hollow body according to claim 2, wherein the graphite fibrils are present in the inner layer (II) in an amount of from 1.5 to 10% by weight based on the amount of the inner layer (II).

18. The hollow body according to claim 2, wherein the graphite fibrils are present in the inner layer (II) in an amount of from 2 to 7% by weight based on the amount of the inner layer (II).

19. The hollow body according to claim 2, wherein the outer layer (I) comprises a polyamide molding composition, a polyolefin molding composition, a polyester molding composition or a polyester elastomer molding composition.

20. The hollow body according to claim 2, wherein the inner layer (II) comprises a polyamide molding composition, a polyolefin molding composition, a polyester molding composition or a fluoropolymer molding composition.

21. The hollow body according to claim 20, wherein the inner layer (II) is a fluoropolymer molding composition comprising a fluoropolymer selected from the group consisting of an ethylene-tetrafluoroethylene copolymer or terpolymer (ETFE), a tetrafluoroethylene-hexafluoropropene-vinylidene fluoride terpolymer (THV), an ethylene-chlorotrifluoroethylene copolymer (ECTFE) and a polyvinylidene fluoride (PVDF).

22. The hollow body according to claim 21, wherein the fluoropolymer is a PVDF homopolymer or a copolymer of vinylidene fluoride containing up to 40% by weight of other monomers.

23. The hollow body as claimed in claim 2, further comprising a barrier layer for fuel components as an intermediate layer between said inner layer and outer layer.

24. The hollow body according to claim 23, wherein the barrier layer comprises a polyester molding composition, a PVDF molding composition, or an EVOH molding composition.

25. The hollow body according to claim 24, wherein the barrier layer is polybutylene terephthalate.

26. The hollow body according to claim 2, wherein said inner layer and said outer layer each have a thickness, and wherein one or more additional layers each having a thickness are optionally present wherein a ratio of the thickness of the inner layer to the thickness of the outer layer or to a sum of thicknesses of all other layers is from 1:5 to 1:100.

27. The hollow body according to claim 2, wherein the outer layer (I) comprises a polyamide molding composition and the inner layer (II) comprises a polyamide molding composition.

28. The filling port according to claim 3, wherein the graphite fibrils are present in the inner layer (II) in an amount of from 1 to 30% by weight based on the amount of the inner layer (II).

29. The filling port according to claim 3, wherein the graphite fibrils are present in the inner layer (II) in an amount of from 1.5 to 10% by weight based on the amount of the inner layer (II).

30. The filling port according to claim 3, wherein the graphite fibrils are present in the inner layer (II) in an amount of from 2 to 7% by weight based on the amount of the inner layer (II).

31. The filling port according to claim 3, wherein the outer layer (I) comprises a polyamide molding composition, a polyolefin molding composition, a polyester molding composition or a polyester molding composition.

32. The filling port according to claim 3, wherein the inner layer (II) comprises a polyamide molding composition, a polyolefin molding composition, a polyester molding composition or a fluoropolymer molding composition.

33. The filling port according to claim 32, wherein the inner layer (II) is a fluoropolymer molding composition comprising a fluoropolymer selected from the group consisting of an ethylene-tetrafluoroethylene copolymer or terpolymer (ETFE), a tetrafluoroethylene-hexafluoropropene-vinylidene fluoride terpolymer (THV), an ethylene-chlorotrifluoroethylene copolymer (ECTFE) and a polyvinylidene fluoride (PVDF).

34. The filling port according to claim 33, wherein the fluoropolymer is a PVDF homopolymer or a copolymer of vinylidene fluoride containing up to 40% by weight of other monomers.

35. The filling port as claimed in claim 3, further comprising a barrier layer for fuel components as an intermediate layer between said inner layer and said outer layer.

36. The filling port according to claim 35, wherein the barrier layer comprises a polyester molding composition, a PVDF molding composition, or an EVOH molding composition.

37. The filling port according to claim 36, wherein the barrier layer is polybutylene terephthalate.

38. The filling port according to claim 3, wherein said inner layer and said outer layer each have a thickness, and wherein one or more additional layers each having a thickness are optionally present wherein a ratio of the thickness of the inner layer to the thickness of the outer layer or to a sum of thicknesses of all other layers is from 1:5 to 1:100.

39. The filling port according to claim 3, wherein the outer layer (I) comprises a polyamide molding composition and the inner layer (II) comprises a polyamide molding composition.

40. The plastic pipe according to claim 1, wherein the outer layer (I) comprises a polyacetal molding composition or a polyketone molding composition.

41. The plastic pipe according to claim 1, wherein the inner layer (II) comprises a polyacetal molding composition or a polyketone molding composition.

42. The plastic pipe according to claim 11, wherein the barrier layer comprises a polyketone molding composition or a polyacetal molding composition.

43. The hollow body according to claim 2, wherein the outer layer (I) comprises a polyacetal molding composition or a polyketone molding composition.

44. The hollow body according to claim 2, wherein the inner layer (II) comprises a polyacetal molding composition or a polyketone molding composition.

45. The hollow body according to claim 23, wherein the barrier layer comprises a polyketone molding composition or a polyacetal molding composition.

46. The filling port according to claim 3, wherein the outer layer (I) comprises a polyacetal molding composition or a polyketone molding composition.

47. The filling port according to claim 3, wherein the inner layer (II) comprises a polyacetal molding composition or a polyketone molding composition.

48. The filling port according to claim 35, wherein the barrier layer comprises a polyketone molding composition or a polyacetal molding composition.

* * * * *